United States Patent [19]
Melugin

[11] Patent Number: 6,088,922
[45] Date of Patent: Jul. 18, 2000

[54] METHOD AND APPARATUS FOR HYDROSTATICAL LEVELING

[76] Inventor: Dwayne R. Melugin, 218 N. Madison, Webb City, Mo. 64870

[21] Appl. No.: 09/115,703

[22] Filed: Jul. 15, 1998

[51] Int. Cl.[7] .............................. G01C 9/00; G01C 9/18
[52] U.S. Cl. ................................ 33/367; 33/333
[58] Field of Search ........................ 33/367, 365, 333, 33/370, 371

[56] References Cited

U.S. PATENT DOCUMENTS

| | | | |
|---|---|---|---|
| 2,814,127 | 11/1957 | Blatchford | 33/367 |
| 3,212,195 | 10/1965 | Paarma | 33/367 |
| 3,577,645 | 5/1971 | Zurawski | 33/367 |
| 4,169,320 | 10/1979 | Bennett | 33/367 |
| 4,231,163 | 11/1980 | Turloff | 33/367 |
| 4,384,410 | 5/1983 | Melugin et al. | 33/367 |

*Primary Examiner*—Diego Gutierrez
*Assistant Examiner*—Faye Francis
*Attorney, Agent, or Firm*—Head Johnson & Kachigian

[57] ABSTRACT

A method and apparatus for hydrostatic leveling including a pair of liquid filled containers connected by a liquid hose for equalizing static pressure in the mercury pools in the indicating heads and a gas hose for equalizing the gas or vapor pressure within the heads above the mercury. Each head has an internal float with a display gauge. The indicating heads have identical structures and thus when they are resting on the level surface they may be reversed in location without change in gauge indicator reading; any difference in the reading is a measure of out-of-level condition. An elevator is used to support one head while a mobile tool is used to support the other head. The elevator comprises a rigid body that is secured to a stable structure adjacent the object to be leveled and includes a vertically displacable set-off for supporting the head. The mobile tool includes a level system for insuring consistent alignment of the head to the object being leveled. When used, the second head is placed on the tool and both are leveled against the object. The first head on the elevator set-off is then vertically displaced until level with the second head by rotating a screw-jack on the elevator. When both heads read identically, they are in the same plane and a reference measurement is obtained from an associated digital meter. Subsequent measurements are taken by moving the mobile tool about the object periphery and leveling the second head at the new position. The first head is then vertically displaced until both heads are level and in the same horizontal plane. The elevation or position of the new position is measured from the original starting position or the reference point by the meter and this vertical variance is recorded. Several variances may be compiled to form a profile for subsequently leveling the object.

16 Claims, 6 Drawing Sheets

METHOD AND APPARATUS FOR HYDROSTATICAL LEVELING

BACKGROUND OF THE INVENTION

1. Field of the Invention

The present invention relates generally to leveling systems and particularly leveling systems which rely on hydrostatic pressure and the fact that fluids at equal pressures and in fluid flow communication will equalize. More particularly, the present invention relates to a method of using a hydrostatic leveling system to precisely level large, unwieldy objects, such as reciprocating gas compressors used in the petrochemical industry and the like.

2. Description of Prior Art

Related art may be found in U.S. Class 33, subclasses 367 and 378, Class 73, subclasses 722 and 728, among others. Of particular relevance is my prior patent, U.S. Pat. No. 4,384,410, the teachings of which are expressly incorporated by reference herein.

In my earlier patent, a hydrostatic leveling device was presented that used the self-leveling principle. This principle was utilized in a U-tube manometer where, in the absence of some applied force or pressure, the liquid level in the two arms of the U-tube will be at the same level. Even if the two arms of the U-tube were separated by a substantial distance, the liquid level would be the same in each tube.

The extended U-tube arrangement mentioned above and discussed in great detail in my earlier patent was utilized as a leveling device on limited occasions but it was mainly used for vertical measurements. The original function of the level was to measure the difference between one vertical plane and another vertical plane. This difference was measured on a pair of interconnected, spaced apart indicating heads. The vertical difference between these respective planes was measured directly by the movement of the floats attached to each indicating head. However, these measurements suffered from several problems decreasing their accuracy. For example, as the floats move off of zero or a neutral position there is interference caused by the hysteresis and friction of the mechanical indicator. Also, there is friction of movement of mercury on the sides of the mercury container, the float, and the connecting hose. Also on the original level, measurements were limited to less than one quarter inch of vertical movement.

The manufacturers of mechanical indicators as well as electrical indicator and electrical transducers or L.V.D.T. (Linear Variable Differential Transformer) admit in their claims of accuracy for their equipment, that the farther you move off of zero position or a null position, the more inaccurate the measurement is. In other words, their equipment will measure levelness far move accurately than it will measure vertical differences.

Another problem in many industries, especially the petrochemical industry, where large reciprocating gas compressors are used, is the lack of appropriate surfaces to set the indicating heads on. These motors are often thirty or forty feet long and generate from one to five thousand horsepower. When you add the power pistons as well as the compressor pistons to the movement of the main crankshaft you have dynamic movement in several different directions at the same time that causes a great deal of vibration.

In fact, in almost all cases the only precision machined surface that is exposed is the bottom of the engine frame. While the engine frame bottom is often exposed, there is generally less than one inch of space between the bottom of the frame and the foundation that the compressor sets upon.

Due to the small amount of room available to the operator to have access to a machined surface (the bottom of the engine) as well as the extreme vibration caused by the operation of the engine, it is very difficult to get a precision profile of the bottom of the engine.

SUMMARY OF THE INVENTION

By incorporating several critical components into my prior hydrostatic measuring system, a new combination is provided that overcomes several of the problems discussed above. For example, with the new device, an operator can easily measure several feet of difference in vertical elevation between the horizontal planes on which the indicating heads are resting. Further, the indicating heads are no longer required to measure a vertical distance but only to repeat back to a zero position. All differences between the planes are measured by a high precision glass scale attached to a digital measuring device. The apparatus according to the invention provides a precision hydrostatic leveling system which is capable of resolving measurements to one one-thousandth of an inch or better over substantial distances up to 100 feet or more.

The apparatus includes a pair of identical containers or indicating heads with pools of mercury connected by a flexible hose, a vertically adjustable platform for mounting one of the indicating heads, a digital measurement device, and a mobile stabilizing tool for supporting the second indicating head.

Each indicating head has an internal float coupled to the stem of a precision gauge with an indicator reading in ten-thousandths of an inch (or comparable metric units). A precision level according to the invention will find use in connection with installing or operating large machine tools, pieces of precision equipment, or other precision instruments. It may be employed with lasers which then will greatly extend measurement range. The precision leveling system of the present invention is far more precise than commonly used arrangements such as transits or the like.

A mercury tube connects the two indicating heads and a vapor tube is provided connecting the space above the mercury pool in each head to the corresponding space in the other head to assure that there is no difference in vapor pressure above the respective mercury pools which could cause the pool levels to differ. At the same time the apparatus prevents escape of mercury vapor which could occur if the space above the mercury pool were vented to the atmosphere.

The base of each indicating head is provided with a magnetic-attracter device to cause the indicating head to be held down very firmly (with a force of 30 to 100 pounds, for example) on a ferro-magnetic metal surface on which it is placed. The magnetic attracter device eliminates any film which might exist between the base of the indicator head and the surface on which it rests; because of the high precision on the order of one thousandth of an inch, even an air film under the indicator base could produce a significant error.

Although liquids other than mercury could be utilized in apparatus according to the present invention, the characteristics of mercury with its very high density contribute to the precision of the system.

A columnar extension from the bottom of the float provides a substantial portion of the buoyancy for the float and also resides in a small diameter well in the bottom of the mercury pool thereby maintaining the centered relationship of the float in the presence of lateral forces which might damage the internal mechanism or the gauge stem.

The elevator includes a vertically displaceable platform or set-off that supports one indicating head. The elevator is actuated by a screwjack that vertically displaces the set-off to move the indicating head up or down. Indicating head movement is measured by an associated digital meter.

In use, one indicating head is placed on the moveable platform and the other indicating head is placed against the workpiece to be leveled. If there is a sufficiently large, exposed, portion of the workpiece available to set the level on (approximately two inches square) then the stabilizing tool is not required. The tool, which can take various geometric shapes, utilizes areas as small and smaller than one quarter inch of exposed surface as well as the bottom of the engine.

The tool comprises a plate defining a raised support pad to set an indicating head upon and a probe or point that comes in contact with the object to be leveled. The probe may set against either on top of the object or the bottom of the object. If the bottom of the object is to be measured then this probe is held in place by means of a spring loaded pin.

The primary purpose of this tool is to be able to reproduce the exact orientation between the pad that the level is setting on and the tip of the probe that is in contact with the object that is being leveled. To be able to reproduce this exact relationship between the pad that the level is setting on and the tip of the probe, two channels are defined in the metal tooling plate. These two channels are preferably angled ninety degrees to one another and are fitted with precision leveling bubble vials. With these leveling vials mounted 90° to one another, the pad and the tip of the probe may be positioned in two axes. This allows an operator to reproduce the same orientation of the tip of the probe and the indicating head. As a result, an operator may move the tooling plate, with the indicating head setting on it, about the object to be leveled and have the same exact relationship between the tip of the probe and the indicating head at different locations about the object.

In addition to providing the features and advantages described above, it is an object of the present invention to provide a precision hydrostatic leveling system wherein a pair of leveling heads interconnected by a hose contain connected pools of mercury with floats therein and precision gauges for indicating the position of the float within the head with an accuracy better than one thousandth of an inch to enable an operator to precisely level a large object.

It is yet another object of the present invention to provide such a system wherein a vapor tube connects the indicator heads and equalizes the vapor pressure above the mercury pool.

It is another object of the present invention to provide a method that enables an operator to precisely level a large object.

A related object of the present invention is to provide a method for producing vertical profiles for large objects such as reciprocating gas compressors.

Another object of the present invention is to provide a method for accurately reproducing measurements about the periphery of a large object during leveling.

A basic object of the present invention is to provide an apparatus for dependably leveling large objects.

Yet another basic object of the present invention is to provide an apparatus that requires minimal instructions for operation during a leveling process.

A basic object of the present invention is to provide and apparatus that may be used to produce a vertical variance profile of a large object without disturbing the object.

Yet another object of the present invention is to provide a mobile leveling apparatus that may be conveniently moved from site to site to level large objects.

Other objects and advantages of the present invention will be apparent from consideration of the following description in conjunction with the appended drawings.

DETAILED DESCRIPTION OF THE INVENTION

Figure 1:
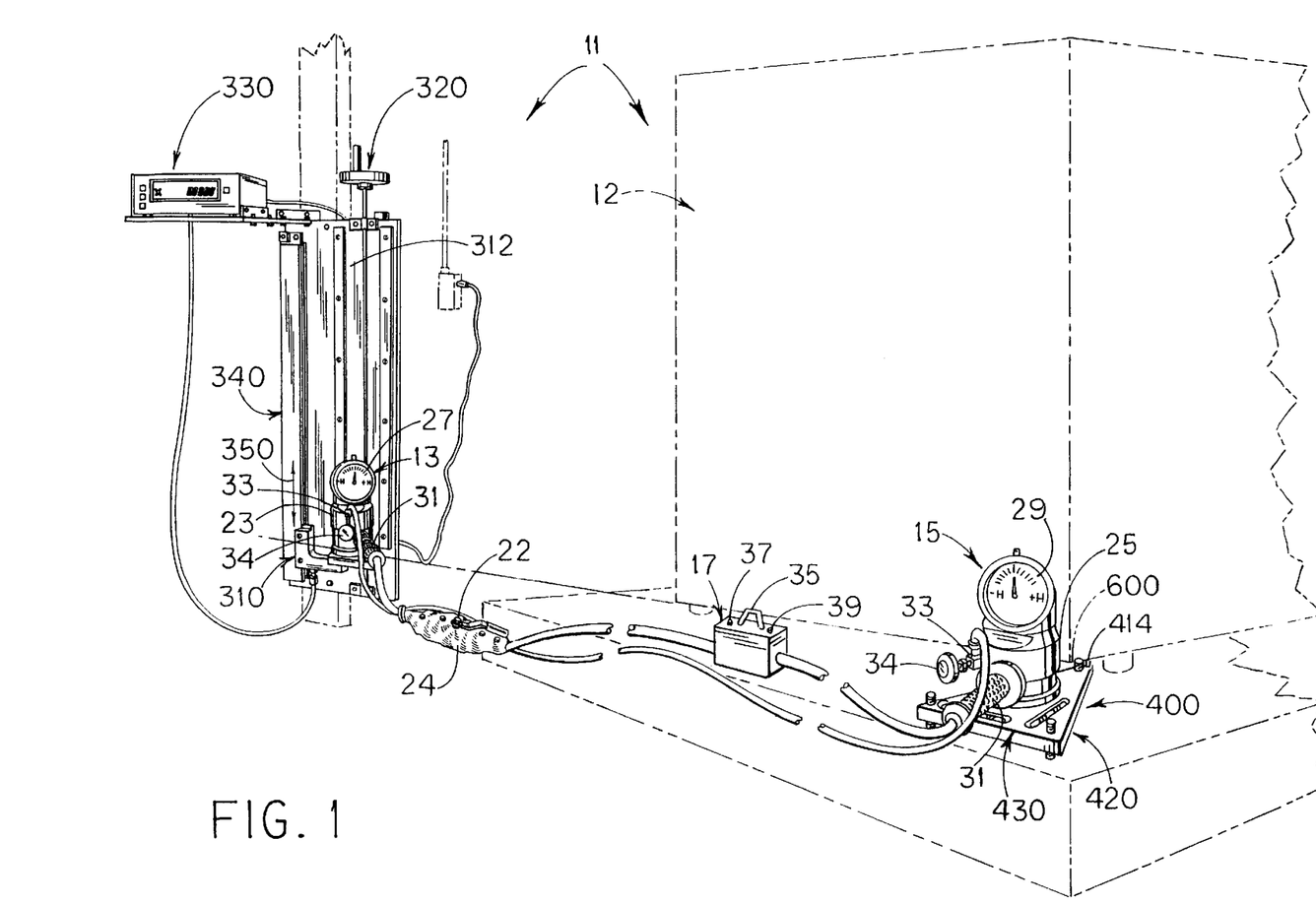
FIG. 1 is a partially schematic illustration of my precision hydrostatic leveling system according to the invention.

Referring to the drawings and particularly to FIG. 1, a precision hydrostatic leveling system 11 for leveling large objects 12, such as reciprocating compressors or the like, is shown according to the invention. System 11 includes a first liquid container or indicating head 13 and a second container or indicating head 15. Head 13 is mounted on a vertically displaceable elevator 300 while head 15 is deployed on a mobile tool 400 adapted to be placed against the object 12 being leveled. In use, the head 15 is placed against object 12 and head 13 is raised or lowered as necessary until the gauges indicate that heads 13 and 15 are on the same horizontal plane. At this point, a reference plane (i.e. plane 600) is established against which subsequent measurements may be made to compile a vertical variance profile. The profile may then be used to level the object 12.

Indicating heads 13 and 15 are connected by a hose 18 including segments 19 and 20 passing through a control box 17. Hose 18 is a metal reinforced plastic or rubber hose adapted to hold the mercury working liquid for the system.

Another hose 21 also connects indicator heads 13 and 15 and may be formed from lighter weight materials. Hose 21 provides for gas containment and equalizes the vapor pressure in the two indicator heads 13 and 15.

Indicating head 13 includes a metal housing 23 formed of steel or other rugged material and a gauge indicator 27 in the form of a standard gauge indicator capable of measuring dimensions to at least one thousandth of an inch. Specifically the gauge indicator 27 is graduated in ten-thousandths. Indicating head 15 is identical to indicating head 13 and includes a housing 25 and gauge indictor 29. The dimensions of the critical components of heads 13 and 15 should have matching dimensions to better than one thousandths of an inch although small differences can be compensated by calibration of gauges 27 and 29.

Conventional connectors 31 connect the hose segment 19 to housing 23 and hose segment 20 to housing 25. An intermediate valve 22 with protective padding 24 controls fluid flow between hose segments 19 and 20. The conductive metal reinforcement of hoses 19 and 20 is preferably conductively connected to housing 23 and 25, respectively, as explained in my prior patent.

Control box 17 contains an electrical power supply and control circuit which actuates thumper mechanisms in the floats of the indicator heads 13 and 15 as is also explained in detail in my prior patent. An indicator lamp 37 is operated simultaneously with the thumper actuators and provides an indication that the control box apparatus 17 is operating properly. A handle 35 is provided for the control box 17 and a switch 39 for activating the power supply and control circuits therein. Control box 17 may be powered with internal rechargeable batteries and provided with a battery charger connected to control box 17 by a cord.

Within metal housing 23 is a cup of electrically nonconductive material which acts as a container for the pool of mercury. A fitting on the cup connects to hose segment 19 and forms a passageway from the mercury pool which continues to the other indicating head 15.

Hose segments 19 and 20 are connected midway between indicator heads 13 and 15 by a coupling formed of electrically conducted material. An electrical connector on the coupling is preferably connected by a lead to the control circuit within control box 17. The lead is therefore an electrical contact with the mercury through the connector and the coupling.

Another lead extends from the control box 17 to flanges and which are interconnected by the electrical lead. Thus two conductive paths are provided from control box 17 to each of the indicator heads 13 and 15, one conductive path being through the metal reinforcing (not shown) in hoses 19 and 20, and the other electrical connection being through the mercury itself. The flanges on hose segments 19 and 20 electrically connect to the metal reinforcement and a lead connects each flange to metal housing 23 or 25.

As discussed in my prior patent, the internal float in each indicating head 13 and 15 is preferably formed of nonmagnetic material such as aluminum alloy or stainless steel alloy. The float has a top portion which is electrically insulated from the remainder of the float by a gasket and is secured to stem of gauge indictor 27. Thus upward and downward movement of float is directly indicated on gauge indicator 27, which in a normal case will read in ten thousandths of an inch. A diaphragm which is very flexible closes the gap between the float and the cup so that the mercury pool retained within the cup will not find its way into other parts of the mechanism. A vent opens the space above the float so that any effect of atmospheric pressure on diaphragm in the two indicating heads is counter-balanced. In the fully developed version of the apparatus, a vent is also provided in the space just below diaphragm and the vent is connected by the vapor hose 21 to the opposite indicator head to equalize pressure between the indicating heads 13 and 15.

The float has a liner of conductive material within which is a solenoid coil wound on a bobbin. A magnet is placed loosely in the hollow core of the solenoid bobbin so that the top of magnet is slightly above the center line of the solenoid coil. This causes the magnet to be lifted when the solenoid coil is energized and upon de-energization the magnet drops; as it strikes the top and bottom of the float, it sets up a short damped vibration, which preferably has a magnitude of a few ten-thousandths of an inch. The direction of current through the coil is matched to the polarity of the magnet to produce a lifting force thereon. The magnet could be replaced by a soft iron armature in which case either direction of current in the coil (or alternating current) would be acceptable. One of the conductive paths for the excitation current for the solenoid coil may be through a lead to the conductive liner and to the wall of float, which is in contact with mercury. The other path may be through a lead to the top portion of the float and the stem of gauge indicator 27, which is in electrical contact with the housing 23 of indicating head 13.

As previously mentioned, head 13 and head 15 are virtually identical and in particular great care is taken to make the important dimensions of the two devices quite nearly identical. As is explained in my prior patent, the procedure for their use involves adjustment of gauges 27 and 29 which would accommodate very small dimensional differences on the order of a few thousandths of an inch at most. But one wishes to have the function of the two heads be sufficiently identical to eliminate significant errors arising from differences in the two indicating heads.

The internal float is of substantial volume, a cubic inch or more, and thus has considerable buoyancy in the very dense mercury liquid. Accordingly, the very slight force from the gauge stem on the float has an insignificant effect on the flotation level of the float. Even greater precision is obtained by the thumper mechanism comprising a solenoid and magnet which produces a damped oscillation overcoming friction, drag and surface tension effects on the position of the float.

A well-known approach to reducing friction or hysteresis in a measuring or indicating system is to subject the system to a decaying sinusoidal excitation superimposed on the signal or quantity which is being measured. While the fundamental principal is old, the present procedure and apparatus whereby such a damped oscillation is imparted is novel and produces particularly effective results.

Obviously a great variety of mechanisms might be employed to produce an oscillation of the float which would then be allowed to decay to a position accurately representative of the mercury liquid level. For example a motor or vibrator could be utilized to vibrate the float through some physical contact or through stem. The internal electromagnetic thumper provided by the present invention is notably more effective than such a motor driven vibrator mechanism.

The electromagnetic thumper in the float is very economical with respect to energy usage. It may conveniently have a duty cycle of approximately 0.05 whereas a motor vibrator would require a greater duty cycle.

Furthermore, the thumper utilizes almost all the energy supplied in a short impulse as the magnet strikes the top or bottom of the float. Energy consumption is a relevant consideration because it is preferably to operate the apparatus on a small rechargeable battery and the low energy consumption contributes to a long period between battery recharges. The battery may be recharged while the system is in use with the charger connected.

Figure 2:
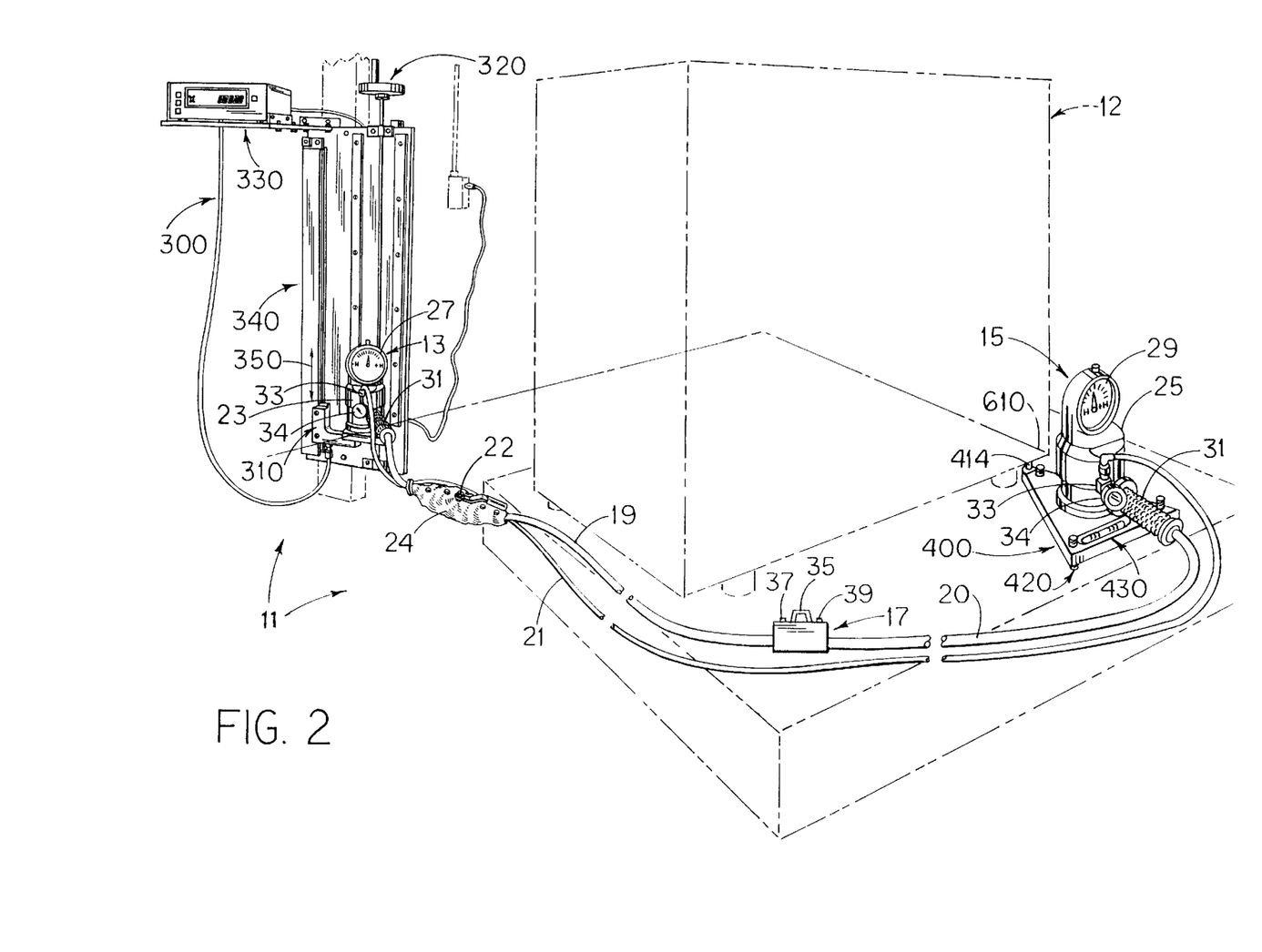
FIG. 2 is a partially schematic illustration similar to FIG. 1, showing a precision hydrostatic leveling system according to the invention, with the second indicating head in a moved position.

In FIGS. 1 and 2 indicating heads 13 and 15 are shown as left and right handed versions, but this is not necessary and the two indicating heads 13 and 15 may be absolutely identical. Thus, only connected to each indicating head 13 and 15 is a vapor hose 21 which is secured by a conventional coupling 33. Preferably, a valve 34 permits selective closure of hose 21 during head movement. Also connected to indicator heads 13 and 15 is a mercury hose 18 secured by a coupling 31. Both coupling 33 and coupling 31 may be threadedly engaged in the sidewall of housings 23 and 25.

Housings 23 and 25 both include a base portion having an annular groove in the bottom thereof in which is secured by adhesive or other means an annular magnet magnetized with a north pole at the top surface and a south pole at the bottom surface. Preferably the center of the base has a cylindrical recess. Thus, when the base is set on a flat surface it has relatively small area of contact represented by an annulus and the rim of the base. The material of the base is steel or other ferro-magnetic material so that the south pole of magnet strongly attracts ferro-magnetic surface on which the indicating head is placed. The annulus and the rim form flux paths which enhance the attraction due to the magnet. It has been found that the high precision provided by apparatus according to the invention makes it highly desirable to eliminate an air film which might form between the base of the indicating head and a flat surface on which it is placed. This construction causes a force of approximately 30 pounds to 100 pounds to be produced to attract the rim to a flat ferro-magnet surface on which it is placed; this force is more than adequate to break and eliminate an air film which would be a possible source of error in the indicator reading.

The top of each housing 23 and 25 is closed by a cover which has integrally formed therewith a mounting post. Gauge indicator 29 includes a case which is secured by screws or other suitable means to the mounting post.

Each gauge 27 and 29 has a rotatable bezel and a crystal of conventional form. A stem tube extends from the bottom of the case and encloses the stem which is the moveable measuring element of gauge 29. The entire structure of each gauge 27 and 29 is conventional and has not been shown in detail; it includes a bezel lock screw for rotatable bezel.

In order to minimize the effects of friction, a built-in thumper mechanism including a magnet and solenoid produces periodic physical impulses which impart a vertical oscillation to the internal float which is rapidly damped, primarily by the fluid damping provided by mercury.

The pulse rate for the thumper mechanism is not critical but a rate of approximately one pulse per second is sufficiently rapid to prevent build-up of errors due to friction or hystersis and provides adequate time to read the indicator on gauge 27 or 29 after the oscillations (which are visible on the gauge) die off in a fraction of a second. It will be noted that the operator is able to visually observe the fact that friction and hysteresis effects are eliminated by the thumper. When both indicator heads are stationary and there is no perturbation of the system the indicators should return to the same reading after each momentary oscillation at intervals of one second. If the indications were not repeatable it would be an indication that some parts of the mechanism were binding or that there was some abnormal friction effect which was interfering with the proper operation of the system.

Switch 39 on control box 17 activates the timer circuits for the thumper mechanism as is discussed in detail in my prior patent. Indicator lamp 37 is a light emitting diode connected in series with an internal resistor to give visual indication of the pulse current supplied to the thumper mechanisms. A convenient handle 35 facilitates movement of box 17 as well to accommodate movement of indicating head 15 about object 12.

Figure 3:
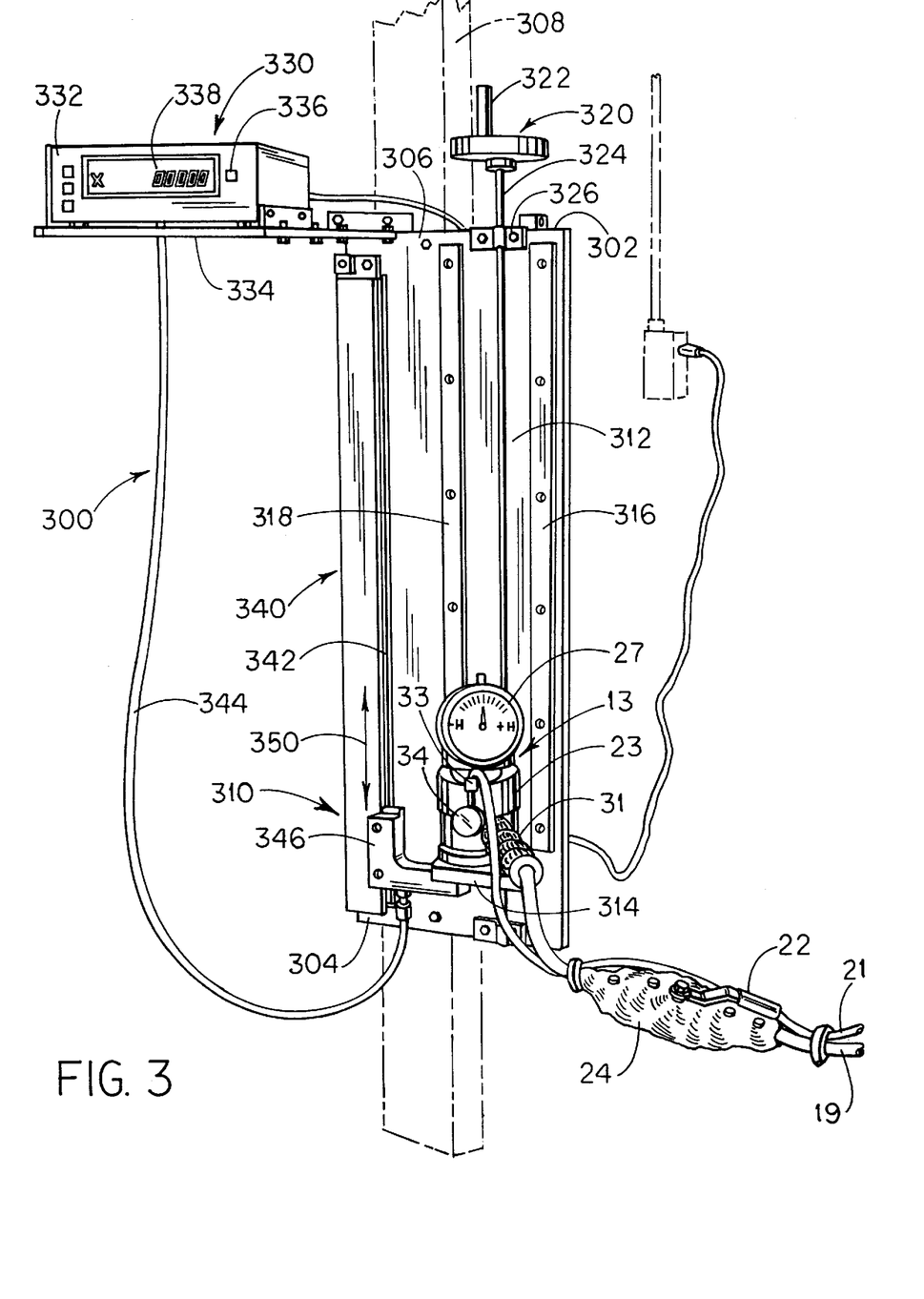
FIG. 3 is a partially fragmented, enlarged view of the adjustable platform with an indicator head as shown in FIG. 1.

The elevator 300 enables an indicating head 13 to be vertically adjusted to equalize its level with the indicating head 15 (FIG. 3). As will be discussed more fully hereinafter, the movement of the indicating head 13 may be measured to accurately produce a compilation of elevations or a vertical variance profile to identify the slope characteristics of the object 12 so that it may be subsequently leveled based upon this profile.

Elevator 300 comprises an elongated frame 302 with an anchoring bottom 304 and top 306. The anchoring bottom and top 304, 306 permit the frame 302 to be secured to a beam 308 or other convenient stable structure. When deployed, the frame 302 is preferably vertically orient with respect to the object 12. In such an orientation, the frame 302 permits the elevator 300 to be manipulated desirably.

Frame 302 supports an offset platform 310 that selectively slides vertically along a channel 312 defining an inner track between captivating sidewalls 316 and 318. The platform 310 includes a vertically displaceable standoff 314 that supports indicating head 13. Preferably, the standoff 314 travels vertically along channel 312 in the track between sidewalls 316 and 318. An upper screwjack 320 vertically displaces platform 310.

Screwjack 320 comprises a handle 322 that rotates an axle 324. Threaded axle 324 actuates platform 310 to move it either upwardly or downwardly in track 312. The axle 324 is secured adjacent top 306 by a bracket 326. Another bracket secures the lower portion of the axle 324 to the bottom of base 302. When changing the elevation of indicating head 13, the user need only turn handle 322 to rotate axle 324 to raise or lower standoff 314 and indicating head 13 accordingly.

An associated digital meter 330 provides a convenient measurement of the amplitude of the vertical movement of indicating head 13. The meter 330 preferably comprises a digital readout 332 with associated control buttons and display screens. Preferably, meter 330 is mounted adjacent atop 306 by a rigid plate 334 so that it is relatively stable with respect to beam 308. As a result, frame 302 and plate 334 serve to immobilize the digital meter 330 even if the object 12 is vibrating excessively.

An associated sight glass 340 enables the digital meter 330 to precisely measure the position of standoff 314. The glass 340 comprises an elongated gauge or glass sight tube 342 that is displaced from track 312 but parallel thereto. A conduit 344 transmits data from the sight tube 342 to the meter 330. A sensor 346 secured to the platform 314 provides an activation light for the meter 330. In use, the activation light 346 permits the meter 330 to accurately measure the movement of the indicating head 13 vertically (as indicated by line 350).

Figure 4:
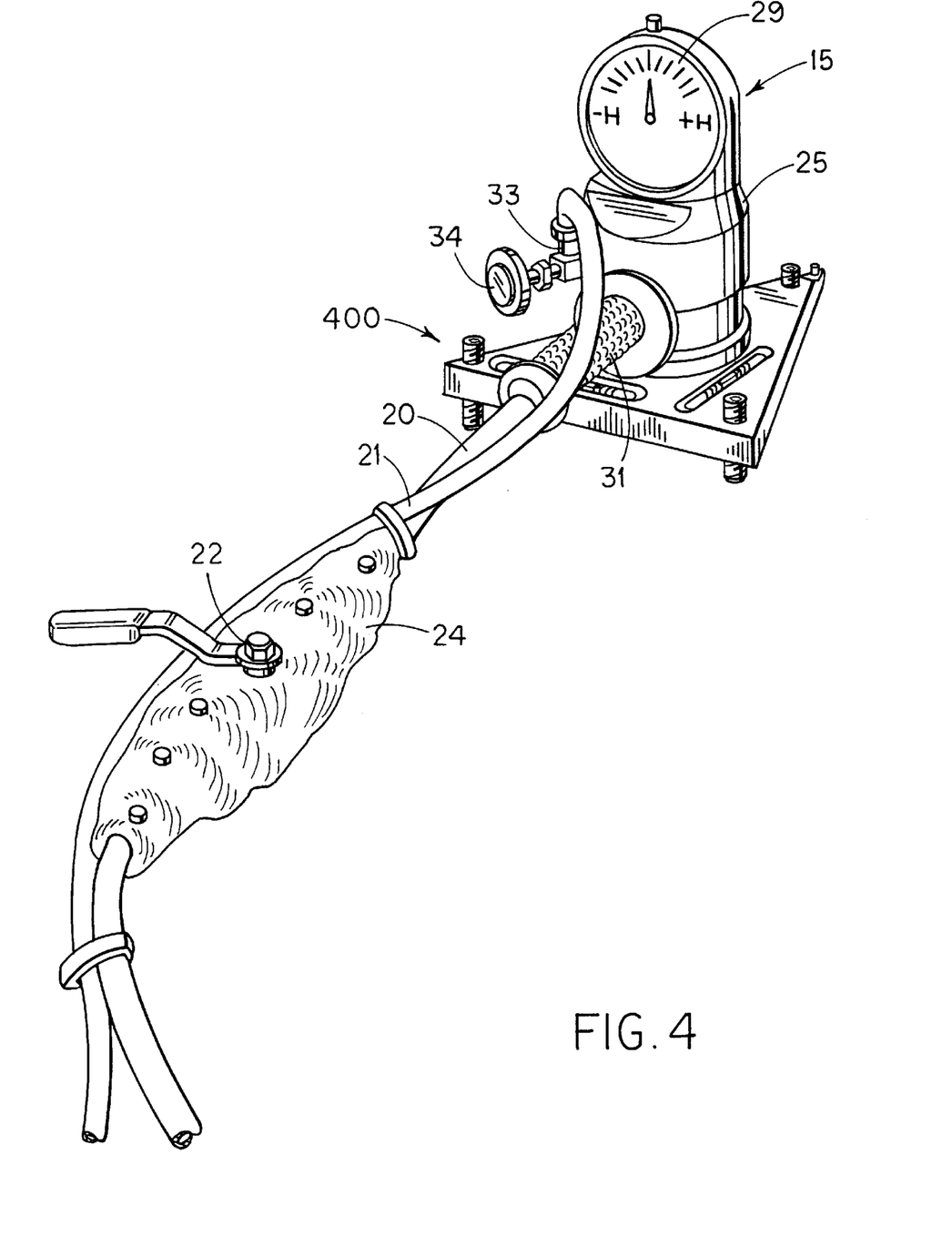
FIG. 4 is a partially fragmented, enlarged view of the tool with an indicator head as shown in FIG. 1.
Figure 5:
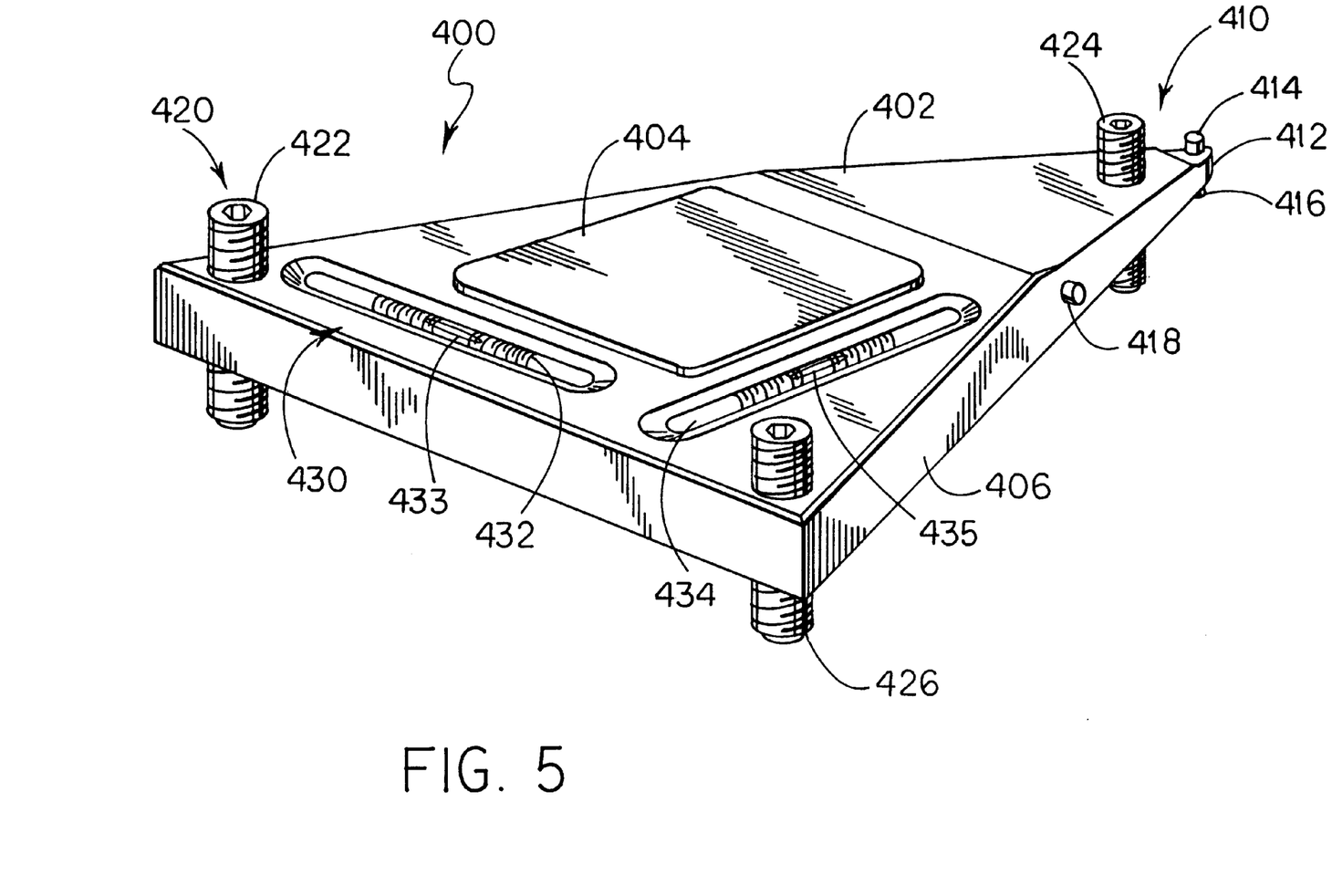
FIG. 5 is a partially fragmented, enlarged view of the tool as shown in FIG. 4.

A stabilizing tool 400 is used with the other indicating head 15 to ensure that the orientation of indicating head 15 with respect to the object 12 remains the same as measurements are taken about object 12 (FIGS. 1 and 2). Tool 400 comprises a rigid body 402 supporting a raised pad 404 (FIGS. 4 and 5). Preferably, adjacent one end of tool 400, body 402 defines a probe 410.

Probe 410 comprises an upper nub 414 and an oppositely mounted lower nub 416 separated by a recessed mounting tip 412. An auxiliary nub 418 is preferably mounted along an adjacent edge 406. Nubs 414 and 416 permit probe use beneath the object 12 or on top of the object 12 as operating parameters dictate.

A plurality of leveling screws 420 are disposed about the periphery of tool 400. Depending upon the geometrical shape of tool 400, the number of leveling screws necessary to level the body 402 may be varied. For example, in the exemplary embodiment shown in FIG. 5, three such screws 422, 424 and 426 level frame 402. Preferably 424 is spring loaded and it biases nub 414 against the bottom of 12. If using 416 the weight of tooling plate 400 holds 416 in contact with 12.

A bubble level system 430 is preferably used to level body 402 when it is placed against object 12. At least two bubble vials 432 and 434 are preferably used to level each axis of the body 402. Thus, the vials are offset by ninety degrees. The bubble vials 432, 434 work in the conventional manner well known in the industry. The bubble system 430 ensures that tool 400 may be moved about object 12 while retaining the same orientation of indicating head 15 to object 12.

Figure 6:
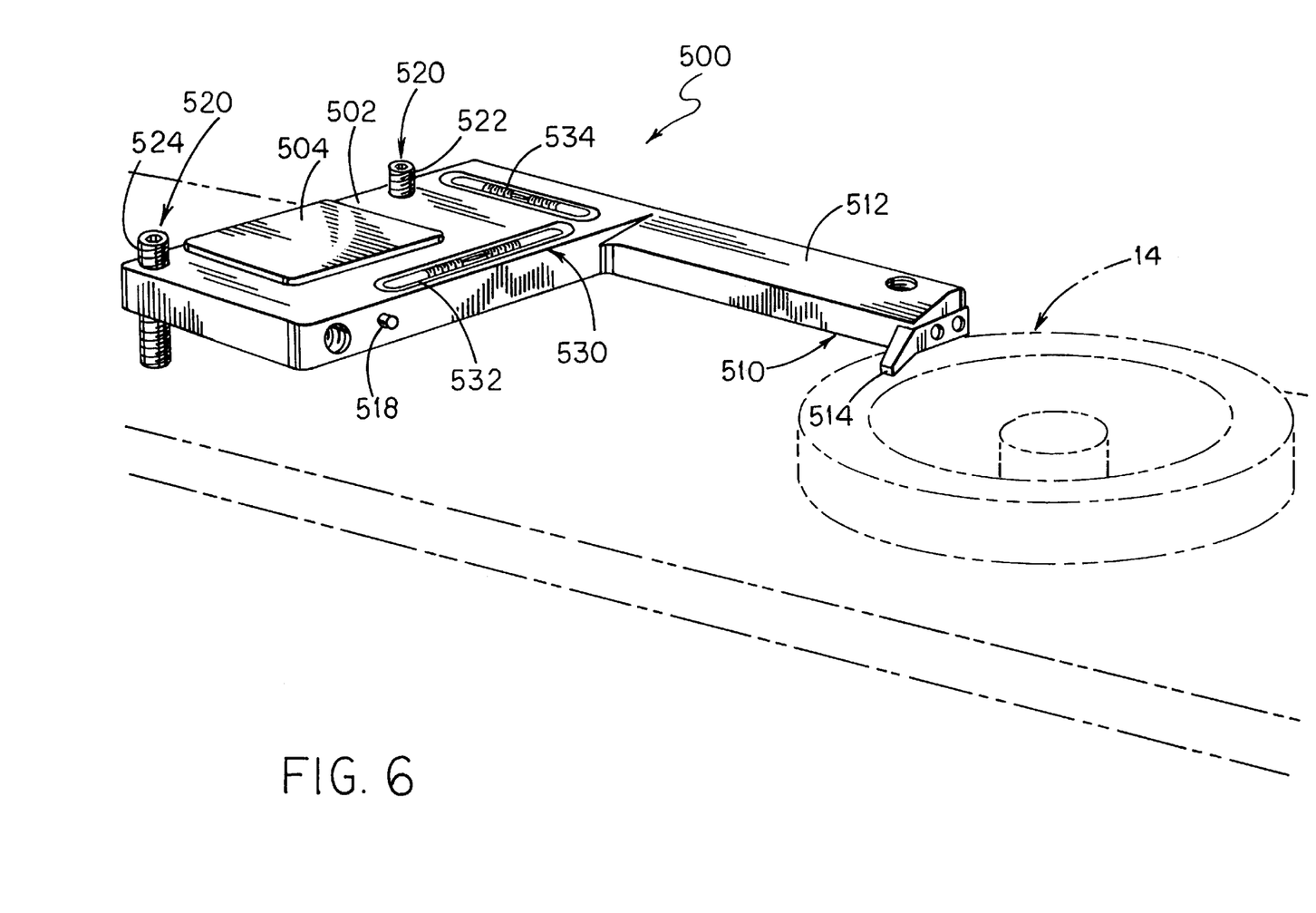
FIG. 6 is a partially fragmented, enlarged view of an alterative tool similar to the tool shown in FIG. 5.

An alternative stabilizing tool 500 shown in FIG. 6. The alternative embodiment of tool 500 is similar to tool 400 in most respects. Tool 500 includes a rigid body 502 with a raised pad 504. Pad 504 is adapted to support an indicating head. An end of body 502 forms probe 510.

Probe 510 comprises an offset stud 514 adapted to be placed upon the object 12. As is shown in FIG. 6, stud 514 is specifically adapted to be placed upon an exposed upper surface 14 of object 12. Elevational screws 520 provide adjustment means for leveling body 502. Elevational means 520 comprises a screw 522 and a screw 524.

The elevational means 520 permits the operator to adjust the body 502 so that the leveling means 530 may be used to align the body 502 with the surface 14. The leveling means 530 comprises a first bubble 532 and a spaced apart, angularly offset second bubble vial 534. Preferably, the first bubble vial 532 is angularly offset from the second bubble vial 534 by 90°. Thus, an operator may level body 502 by centering bubble vials 532 and 534 in the conventional manner.

While the stabilizing tool 400 or 500 could be formed in other geometric shapes, the preferred embodiment for tool 400 uses a roughly triangular outline (FIG. 5) while the alternative embodiment for tool 500 uses a more rectangular shape (FIG. 6). Of course, other shapes are also possible, depending upon the operating parameters and the contours of the object 12. The critical consideration is that the tool 400 (500) permit the operator to accurately and precisely replicate measurements along the periphery of object 12.

Operation

Operation of the precision hydrostatic leveling system will most easily be understood by reference to a specific example. It would be understood however that the particular calibration of the gauges referred to and other specific details are used for illustration and a wide variety of different gauges with different calibrations could be employed within the scope of the system. Assume that indicator gauge 29 has a needle which moves through one complete rotation in response to a displacement amounting to 0.020 inches. Assume also that there are 200 index marks around the periphery of the gauge so that each mark corresponds to 0.0001 inches and ten such marks correspond to the one-thousandth of an inch. Customarily such a gauge also has a smaller dial with a needle which makes one rotation for many rotations of the indicator needle. Assume that the small needle of gauge 29 makes one rotation for ten rotations of the indicator needle. Thus midscale for the gauge would be with the small needle on five and the large indicator needle on zero; the range of the gauge 29 would be plus or minus 0.100 inches.

While detailed calibration procedures are discussed in my prior patent, routine initial calibration of the system may be accomplished by setting up a flat, rigid and stable steel surface level to approximately one ten-thousandths of an inch and then placing the indicator heads on the table. Both should have the same reading and may be adjusted to produce the desired readings.

It should be noted that while the previous description of the precision hydrostatic leveling apparatus has assumed that there would be two indicator heads in the system, it is quite possible to utilize three indicator heads or more. With three indicator heads connected together they could be calibrated two at a time or on a calibration table. A system with three indicator heads would permit a flat two-dimensional surface to be adjusted to level without moving the indicator heads from one position to another. Normally the system with two indicator heads as illustrated herein will be sufficient for any desired precision leveling operation.

Changes in temperature will not affect the operation of the device (though it will cause shift to zero point) so long as the temperature to which all parts of the apparatus, including both indictor heads and connecting hose, is approximately the same. Even if the temperature differs at the position of one of the indictor heads relative to the other, no immediate effect will be produced because of the substantial heat capacity of the mercury and the fact that it is rather well insulated by liner. Thus temperature differences at the two measuring points may be tolerated if readings are taken relatively promptly and the indicator heads are placed close together or otherwise maintained at the same temperature between readings. The effect of temperature variations may also be reduced by arranging connecting hose segments 19 and 20 to be approximately at the level of the mercury; a difference in density in the mercury in hose segment 19 or 20 will produce little effect on the apparatus except in cases where a non-horizontal portion of the hose creates a vertical column of mercury of non-uniform temperature or density.

It should be understood that the particular mechanical gauge shown in conjunction with the disclosed apparatus is illustrative only and may be replaced with any form of accurate physical measurement gauge. Other forms of mechanical gauges may be employed or electronic digital gauges may be utilized. Electronic gauges may be of the non-contracting variety where there is capacitive, inductive or optical coupling between float 53 and the electronic gauge. Either a mechanical gauge or an electronic gauge may have a digital readout. Electronic gauges may be connected electrically and the difference in float displacements calculated electronically. While it is particularly convenient to use the mercury itself as one electronically conductive path for supplying a current pulse to the electromechanical thumper mechanism, very flexible electrical leads may be employed to provide a conductive path to the floats.

As mentioned previously, the primary use of the invention of my prior patent was for measuring vertical differences between indicating heads 13 and 15. However, that invention was subject to several limitations including a small measurement range. The present invention overcomes that limitation and may be used to measure larger vertical differences. In particular, these measurements may be compiled to form a vertical variance profile that may be used to subsequently level object 12.

The operator begins the process by securing elevator 300 to a suitable stable structure such as beam 308. After setting up the elevator 300, the operator then picks a starting point on object 12 (as shown in FIG. 1). After selecting the starting point, the tool 400 is placed against object 12 (for example, against the base). Tool 400 is then leveled by adjusting screws 420 until the bubbles 433 and 435 in the leveling vials 432 and 434 are in their proper place in the vial centers. During tool leveling, the operator maintains contact between the nub 414 of the probe 410 and object 12.

With this accomplished, the hydrostatic level 11 is taken out of its case, the hoses 18, and 21 straightened out on the floor and one indicating head 13 is placed on the set-off 310 of the elevator 300. Making sure that the hoses are untangled, the other indicating head 15 is placed on pad 404 of tool 400 (or 504 of 500).

The level system 11 is activated when power is applied to the digital meter 300 and valve 22 is opened on the level. This permits the mercury contained in each indicating head 13 and 15, and connected one to the other by means of hose 18, to seek a common level. It is unlikely that each reading on each indicator head is the same. If they are not, the indicating head 13, setting on the elevator 300, is moved up or down until each indicating head reads the same. The reading on the indicating head is not important, it is only important that they read the same. To move elevator 300, the operator turns screwjack 320 to move the platform up or down as necessary.

With both indicating heads 13 and 15 reading the same, the operator presses the reset button 336 on the digital meter 300 to establish a reference plane (as indicated by dashed lines 600 in FIG. 1). The readout 338 will indicate a zero reading. This initial plane 600 is the reference plane and all other readings will be compared to it. For example, if the next reading produces another zero, it indicates that the first and second measured (as shown in FIGS. 1 and 2) portions of object 12 lie in the same horizontal plane. On the other hand, if the next reading is plus some amount or minus some amount, this plus or minus reading will be the vertical variance of the first and second measured points and it indicates the vertical difference between their respective planes.

When the operator is ready to move to the next measurement position (as shown in FIG. 2), the operator closes valve 22 in the mercury line 18, then moves the tool 400, with the level sitting on it, to the next point to be measured. The nub 414 (or 416 as the case may be) is again placed against object 12 while the tool 400 is oriented as before by rotating the leveling screws 420.

When the tool 400 is level, the nub 414 and indicating head 15 will be at the same orientation as during the previous placement of tool 400 at the first measurement point. Valve 22 is now opened to allow the mercury in each indicating head 13 and 15 to seek a common level. When the mercury has settled, each indicating head 13 and 15 is checked to see if they read the same. If the reading on the indicating heads 13 and 15 are not the same, then elevator 300 is raised or lowered accordingly until indicating heads 13 and 15 are the same. At this point, heads 13 and 15 establish a horizontal measurement plane (as indicated by dashed lines 610 in FIG. 2) and a direct reading from meter 330 is taken. This reading is the vertical variance or difference in elevation between the reference plane 600 (FIG. 1) and the measured plane 610 (FIG. 2).

This process is repeated around object 12 to produce a vertical variance profile. At least three such measurements are required to produce a vertical variance profile for leveling object 12. Of course, the more measurements that are taken, the more precisely object 12 will be leveled. Preferably, a measurement is taken at each support for object 12 so that it may be leveled at each support to maximize precision.

A method and apparatus for hydrostatic leveling including a pair of liquid filled containers connected by a liquid hose for equalizing static pressure in the mercury pools in the indicating heads and a gas hose for equalizing the gas or vapor pressure within the heads above the mercury. Each head has an internal float with a display gauge. The indicating heads have identical structures and thus when they are resting on the level surface they may be reversed in location without change in gauge indicator reading; any difference in the reading is a measure of out-of-level condition. An elevator is used to support one head while a mobile tool is used to support the other head. The elevator comprises a rigid body that is secured to a stable structure adjacent the object to be leveled and includes a vertically displacable set-off for supporting the head. The mobile tool includes a level system for insuring consistent alignment of the head to the object being leveled. When used, the second head is placed on the tool and both are leveled against the object. The first head on the elevator set-off is then vertically displaced until level with the second head by rotating a screw-jack on the elevator. When both heads read identically, they are in the same plane and a reference measurement is obtained from an associated digital meter. Subsequent measurements are taken by moving the mobile tool about the object periphery and leveling the second head at the new position. The first head is then vertically displaced until both heads are level and in the same horizontal plane. The elevation or position of the new position is measured from the original starting position or the reference point by the meter and this vertical variance is recorded. Several variances may be compiled to form a profile for subsequently leveling the object.

In addition to the variations and modifications of the invention suggested and described above it will be apparent to those skilled in the art that numerous other variations and modifications may be made to the apparatus according to the invention, and accordingly the scope of the invention is not to be deemed limited to the particular embodiments and variations described or suggested, but rather is to be determined by reference to the appended claims.

What is claimed:

1. A hydrostatic leveling system for accurately determining the vertical displacement of horizontal surfaces to aid in leveling large objects, said system comprising:

a first container with an internal indicating float and having a base;

a second container with an internal indicating float and having a base;

a liquid conduit connecting said containers;

a body of liquid filling said containers and conduit;

a tool for placing said second container base in the same horizontal plane as a horizontal surface of an object to be leveled, said tool including a probe adapted to contact the object being leveled, screw means for raising and lowering said tool and at least two bubble vials disposed at an angle to each other to indicate said second container's orientation with respect to said object, said tool enabling an operator to reproduce said orientation as said tool is moved about the periphery of the object being leveled;

an elevator adapted to support and vertically displace the base of said first container to enable the operator to equalize said internal floats; and, means for measuring the amplitude of said vertical displacement.

2. Apparatus as recited in claim 1 wherein said elevator comprises:

an elongated rigid frame;

an anchor for immobilizing said frame;

a vertically oriented channel extending along said frame, said channel defining an inner track for vertically aligned movement;

a vertically displacable set-off adapted to travel in said track while supporting said first container; and, a screwjack for vertically displacing said set-off.

3. Apparatus as recited in claim 2 further including a vapor-tight hose connecting said first and second containers to equalize vapor pressures between said containers.

4. Apparatus as recited in claim 1 wherein said means for measuring comprises:

a digital meter adjacent said elevator;

a vertically oriented glass sight tube parallel to said elevator; and, an activation light responsive to vertical displacement of said first container, said activation light enabling said meter to measure said vertical displacement against said tube.

5. A hydrostatic leveling system for accurately determining the vertical displacement of horizontal surfaces to aid in leveling large objects, said system comprising:

a first container with an internal indicating float and having a base;

a second container with an internal indicating float and having a base;

a liquid conduit connecting said containers;

a body of liquid filling said containers and conduit;

a tool for placing said second container base in the same horizontal plane as a horizontal surface of an object to be leveled;

an elevator adapted to support and vertically displace the base of said first container to enable an operator to equalize said internal floats, said elevator comprising:

an elongated rigid frame;

an anchor for immobilizing said frame;

a vertically oriented channel extending along said frame, said channel defining an inner track for vertically aligned movement;

a vertically displacable set-off adapted to travel in said track while supporting said first container; and, a screwjack for vertically displacing said set-off; and, means for measuring the amplitude of said vertical displacement.

6. Apparatus as recited in claim 5 wherein said tool includes a probe adapted to contact the object being leveled, screw means for raising and lowering said tool and at least two bubble vials disposed at an angle to each other to indicate the orientation of said second container to said object, said tool enabling an operator to reproduce said orientation as said tool is moved about the periphery of the object being leveled.

7. Apparatus as recited in claim 5 further including a vapor-tight hose connecting said first and second containers to equalize vapor pressures between said containers.

8. Apparatus as recited in claim 5 wherein said means for measuring comprises;

a digital meter;

a vertically oriented gauge adjacent said channel; and, an activation light responsive to vertical displacement of said first container, said activation light enabling said meter to measure said vertical displacement against said gauge.

9. A method for leveling a large object without disturbing the object, said method comprising the steps of:

vertically orienting an elevator proximate the object;

placing a tool against a portion of the object at a first position;

leveling said tool;

placing a first indicating head on said elevator;

placing a second indicating head on said tool;

vertically displacing said first head until said first and second heads are on the same horizontal plane;

recording said second head height as a reference position;

moving said tool and said second indicating head to another portion of the object at a subsequent position;

leveling said tool;

vertically displacing said first indicating head until said first and second indicating heads are on the same horizontal plane;

recording the variance between said reference position and said subsequent position;

repeating said previous four steps iteratively as necessary to produce records for a vertical variance profile from which the object may be subsequently leveled.

10. The method as recited in claim 9 wherein said first indicating head comprises a first container with an internal indicating float and having a base and said second indicating head comprises a second container with an internal indicating float and having a base and wherein a liquid conduit connects said containers and a body of liquid fills said containers and conduit.

11. The method as recited in claim 10 wherein said first and second indicating heads further comprise a vapor-tight hose connecting said first and second container to equalize vapor pressures between said containers.

12. The method as recited in claim 9 wherein said tool comprises a probe adapted to contact the object being leveled, screw means for raising and lowering said tool and at least two bubble vials disposed at an angle to each other to indicate the orientation of said second container to said object, said tool enabling an operator to reproduce said orientation as said tool is moved about the periphery of the object being leveled.

13. The method as recited in claim 9 wherein said elevator comprises;

an elongated rigid frame;

an anchor for immobilizing said frame;

a vertically oriented channel extending along said frame, said channel defining an inner track for vertically aligned movement;

a vertically displacable set-off adapted to travel in said track while supporting said first container; and, a screwjack for vertically displacing said set-off.

14. The method as recited in claim 9 wherein said recording steps employ a digital measuring device, said device comprising:

a digital meter supported by said elevator;

a vertically oriented glass sight tube adjacent said elevator; and, an activation light responsive to vertical displacement of said first container, said activation light enabling said meter to measure said vertical displacement against said tube.

15. The method as recited in claim 9 wherein the object is supported at multiple locations and wherein a first location serves as said reference position and each of the remaining locations serve as said subsequent position and variances are measured at said subsequent positions.

16. The method as recited in claim 9 wherein the object comprises at least three corners and wherein a first of said corners comprises said reference position and wherein said remaining corner serves as said subsequent positions and variances are measured at said subsequent positions.

* * * * *